US012687507B2

(12) United States Patent
Omori et al.

(10) Patent No.: US 12,687,507 B2
(45) Date of Patent: Jul. 21, 2026

(54) HOLDER, ANALYSIS APPARATUS INCLUDING THE SAME, AND BATTERY ANALYSIS METHOD

(71) Applicant: SHIMADZU CORPORATION, Kyoto (JP)

(72) Inventors: Takashi Omori, Kyoto (JP); Kenji Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 134 days.

(21) Appl. No.: 18/854,474

(22) PCT Filed: Apr. 6, 2023

(86) PCT No.: PCT/JP2023/014181
§ 371 (c)(1),
(2) Date: Oct. 4, 2024

(87) PCT Pub. No.: WO2023/199833
PCT Pub. Date: Oct. 19, 2023

(65) Prior Publication Data
US 2025/0244264 A1 Jul. 31, 2025

(30) Foreign Application Priority Data
Apr. 13, 2022 (JP) ................................. 2022-066355

(51) Int. Cl.
*G01N 23/2209* (2018.01)
*G01N 23/207* (2018.01)
(Continued)

(52) U.S. Cl.
CPC ..... *G01N 23/2209* (2018.02); *G01N 23/2076* (2013.01); *G01N 23/223* (2013.01);
(Continued)

(58) Field of Classification Search
CPC ........... G01N 23/2209; G01N 23/2076; G01N 23/223; G01N 2223/309; H01M 10/4285
See application file for complete search history.

(56) References Cited

U.S. PATENT DOCUMENTS

| | | | |
|---|---|---|---|
| 2002/0192121 A1* | 12/2002 | Gural ................. | H01M 50/105 |
| | | | 324/432 |
| 2020/0386696 A1* | 12/2020 | Sato ................... | G01N 23/2209 |

(Continued)

FOREIGN PATENT DOCUMENTS

| | | |
|---|---|---|
| JP | 2019-144123 A | 8/2019 |
| WO | 2019/163023 A1 | 8/2019 |

OTHER PUBLICATIONS

JFE Techno-Research Corporation, "JFE-TEC News No. 28", 4 pages, Jul. 2011.

(Continued)

*Primary Examiner* — Chih-Cheng Kao
(74) *Attorney, Agent, or Firm* — Muir Patent Law, PLLC

(57) ABSTRACT
A holder holds a battery which is subjected to X-ray analysis. The battery includes a positive electrode and a negative electrode. A sample chamber for disposing the battery therein is formed inside the holder. The holder includes a body, a beryllium plate, a first resin member, a conductive member, a positive electrode terminal, and a negative electrode terminal. An upper surface of the body is formed with a window. The beryllium plate is arranged in the window. The first resin member is provided on a surface of the beryllium plate. The conductive member is provided between the positive electrode and the first resin member so as to be in contact with the positive electrode of the battery. The positive electrode terminal is electrically connected to the conductive member. The negative electrode terminal is electrically connected to the negative electrode.

12 Claims, 9 Drawing Sheets

(51) Int. Cl.
G01N 23/223 (2006.01)
H01M 10/42 (2006.01)

(52) U.S. Cl.
CPC .. H01M 10/4285 (2013.01); *G01N 2223/076* (2013.01); *G01N 2223/1016* (2013.01); *G01N 2223/309* (2013.01)

(56) References Cited

U.S. PATENT DOCUMENTS

2021/0369220 A1 *  12/2021  Sato ..................... A61B 6/4291
2022/0278381 A1 *  9/2022  Ito .................... G01N 23/20041

OTHER PUBLICATIONS

Kenji Sato et al., "Evaluation of Analytical Precision of Polychromatic Simultaneous WDXRF Spectrometer and Application to Valence Analysis ofCathode Materials of Lithium-Ion Batteries", Analytical Chemistry, 92, pp. 758-765, Dec. 10, 2019.
PCT Written Opinion of the International Searching Authority dated Jun. 20, 2023, for international application No. PCT/JP2023/014181.

* cited by examiner

FIG.5

HOLDER, ANALYSIS APPARATUS INCLUDING THE SAME, AND BATTERY ANALYSIS METHOD

TECHNICAL FIELD

The present invention relates to a holder, an analysis apparatus including the same, and a battery analysis method, and more particularly, to a battery holder to be used in performing X-ray spectroscopic analysis on battery materials.

BACKGROUND ART

In the development of secondary batteries, X-ray spectroscopic analysis of battery materials that constitute a battery is effective to investigate changes in the state of the battery materials due to charging and discharging and degradation. PTL 1 (WO 2019/163023) discloses an X-ray spectroscopic analyzer in which a lithium-ion battery is disassembled and the battery materials to be analyzed are set in a sample holder for analysis.

CITATION LIST

Patent Literature

PTL 1: WO 2019/163023

SUMMARY OF INVENTION

Technical Problem

In general, a secondary battery such as a lithium ion battery is covered with a casing which is made of metal such as stainless steel having a relatively low X-ray permeability in order to protect the internal battery materials, which makes it difficult to perform X-ray analysis on the internal electrodes. Thus, in order to perform X-ray spectroscopic analysis on the battery materials, it is necessary to disassemble the battery and take out the battery materials. However, this method of disassembling and analyzing a battery has a problem of making the analysis troublesome. Further, even if the state of the battery materials at a certain time during charging and discharging can be analyzed, it is difficult to analyze the continuous changes of the battery materials during charging and discharging. Therefore, there has been longing for a method of performing X-ray spectroscopic analysis on the battery materials without disassembling the battery.

The present disclosure has been made to solve the aforementioned problems, and an object of the present disclosure is to provide a holder capable of performing X-ray spectroscopic analysis on the battery materials without disassembling the battery.

Solution to Problem

A first aspect of the present disclosure relates to a holder that holds a battery which is subjected to X-ray analysis. The battery includes a positive electrode and a negative electrode. A sample chamber for disposing the battery therein is formed inside the holder. The holder includes a body, a beryllium plate, a first resin member, a conductive member, a positive electrode terminal, and a negative electrode terminal. An upper surface of the body is formed with a window. The beryllium plate is arranged in the window. The first resin member is provided on a surface of the beryllium plate. The conductive member is provided between the positive electrode and the first resin member so as to be in contact with the positive electrode of the battery. The positive electrode terminal is electrically connected to the conductive member. The negative electrode terminal is electrically connected to the negative electrode.

A second aspect of the present disclosure relates to an analysis apparatus for analyzing a battery. The analysis apparatus includes a holder, a spectrometer, and a signal processing device. The holder holds the battery. The spectrometer disperses characteristic X-rays generated by irradiating the battery which is held by the holder with an excitation beam, and detects the intensity of each wavelength. The signal processing device processes a signal output from the spectrometer. The battery includes a positive electrode and a negative electrode. The holder includes a body, a beryllium plate, a resin member, a conductive member, a positive electrode terminal, and a negative electrode terminal. The body is formed with a sample chamber for disposing the battery therein and a window in the incident direction of the excitation beam. The beryllium plate is arranged in the window. The resin member is provided on a surface of the beryllium plate. The conductive member is provided between the positive electrode and the resin member so as to be in contact with the positive electrode. The positive electrode terminal is electrically connected to the conductive member. The negative electrode terminal is electrically connected to the negative electrode.

A third aspect of the present disclosure relates to an analysis method of a battery which includes the steps of: irradiating a battery held by a holder with an excitation beam; dispersing characteristic X-rays generated from the battery and detecting the intensity of each wavelength; and processing a signal indicating the intensity of each wavelength of the characteristic X-rays. The battery includes a positive electrode and a negative electrode. The holder includes a body, a beryllium plate, a resin member, a conductive member, a positive electrode terminal, and a negative electrode terminal. The body is formed with a sample chamber for disposing the battery therein and a window in the incident direction of the excitation beam. The beryllium plate is arranged in the window. The resin member is provided on a surface of the beryllium plate. The conductive member is provided between the positive electrode and the resin member so as to be in contact with the positive electrode. The positive electrode terminal is electrically connected to the conductive member. The negative electrode terminal is electrically connected to the negative electrode.

Advantageous Effects of Invention

According to the present disclosure, the X-ray spectroscopic analysis can be performed on the battery by irradiating the battery materials with X-rays through the beryllium plate disposed in the window of the holder. Therefore, it is possible to analyze the battery materials without disassembling the battery.

BRIEF DESCRIPTION OF DRAWINGS

FIG. 5 is a cross-sectional view illustrating an example internal configuration of the holder;

DESCRIPTION OF EMBODIMENTS

Figure 1:
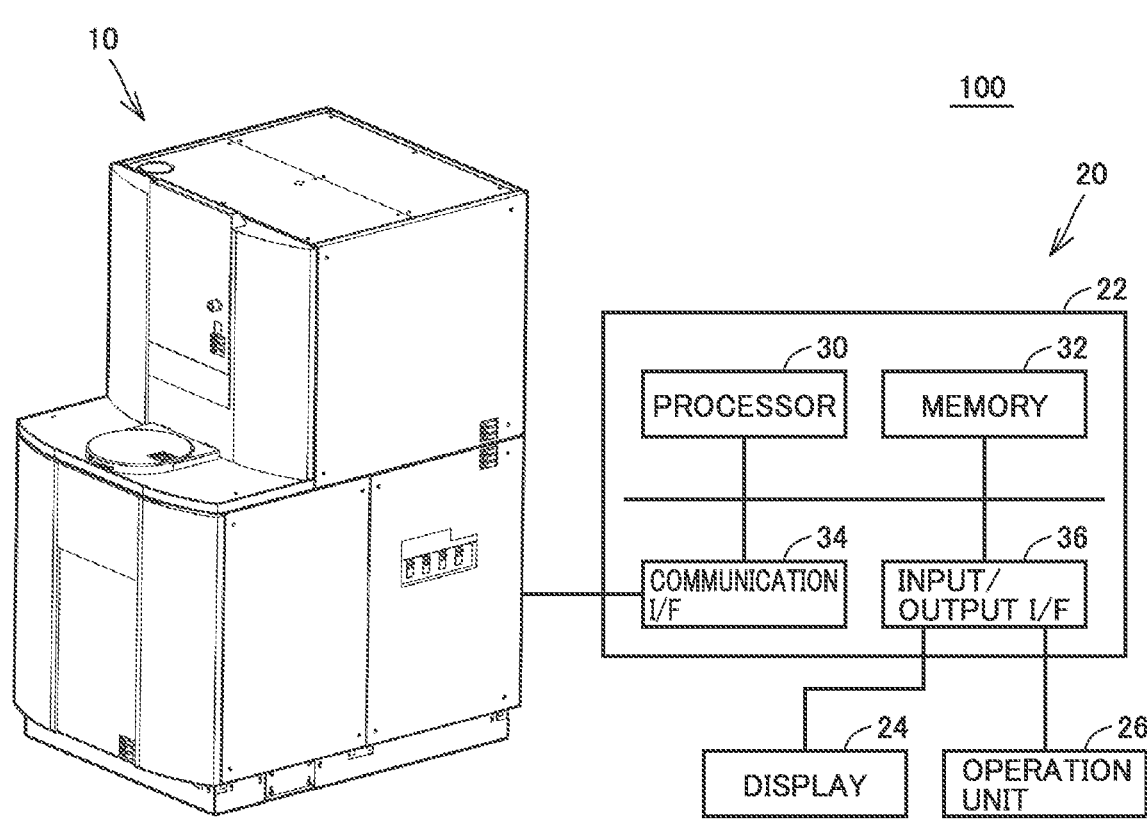
FIG. 1 is a schematic view illustrating a configuration of an analysis apparatus 100 according to an embodiment of the present disclosure.

Hereinafter, embodiments of the present disclosure will be described in detail with reference to the drawings. The same or corresponding parts in the drawings are denoted by the same reference numerals, and the description thereof will not be repeated.

[1. Configuration of Analysis Apparatus]

FIG. 1 is a schematic view illustrating a configuration of an analysis apparatus 100 according to an embodiment of the present disclosure. The analysis apparatus 100 according to the present embodiment is an X-ray spectroscopic analyzer including a wavelength dispersive spectrometer. Hereinafter, a wavelength dispersive fluorescent X-ray analyzer will be described as an example of the X-ray spectroscopic analysis apparatus according to the present embodiment. The wavelength dispersive spectrometer is configured to detect a characteristic X-ray spectrum by dispersing characteristic X-rays using a spectroscopic element and measuring the intensity of each desired wavelength of the characteristic X-rays.

With reference to FIG. 1, the analysis apparatus 100 includes an apparatus body 10 and a signal processing device 20. The apparatus body 10 is configured to irradiate a sample with an excitation beam and detect the characteristic X-rays generated from the sample. In the analysis apparatus 100 according to the present embodiment, the sample is a battery which has a simple configuration and is held by a holder. The excitation beam is typically an X-ray. The characteristic X-rays and the fluorescent X-rays are synonymous in the present disclosure. The detection signal corresponding to the characteristic X-rays detected by the apparatus body 10 is transmitted to the signal processing device 20.

The signal processing device 20 includes a controller 22, a display 24, and an operation unit 26. The signal processing device 20 controls the operation of the apparatus body 10. The signal processing device 20 is configured to process the detection signal transmitted from the apparatus body 10 and display processing results on the display 24.

The display 24 and the operation unit 26 are connected to the controller 22. The display 24 includes, for example, a liquid crystal panel capable of displaying an image. The operation unit 26 receives an operation input from a user to the analysis apparatus 100. The operation unit 26 typically includes a touch panel, a keyboard, a mouse, and the like.

The controller 22 includes, as main components, a processor 30, a memory 32, a communication interface (I/F) 34, and an input/output I/F 36. These components are communicably connected to each other via a bus.

The processor 30 is typically an arithmetic processing unit such as a central processing unit (CPU) or a micro processing unit (MPU). The processor 30 controls the operation of the analysis apparatus 100 by retrieving a program stored in the memory 32 and executing the program. Specifically, the processor 30 executes the program to implement processes including detecting characteristic X-rays generated from the battery B and analyzing the data of detected characteristic X-rays. In the example of FIG. 1, a single processor is illustrated, but the controller 22 may include a plurality of processors.

The memory 32 may be a non-volatile memory such as a random access memory (RAM), a read only memory (ROM), and a flash memory. The memory 32 stores a program to be executed by the processor 30, data to be used by the processor 30, and the like.

The input/output I/F 36 is an interface for exchanging various data between the processor 30 and the display 24 and the operation unit 26.

The communication I/F 34 is a communication interface for exchanging various data with the apparatus body 10, and may be an adapter, a connector, or the like. The communication method may be a wireless communication method using a wireless LAN (Local Area Network) or the like, or may be a wired communication method using a USB (Universal Serial Bus) or the like.

[2. Principle of Wavelength Dispersive X-Ray Analysis]

Figure 2:
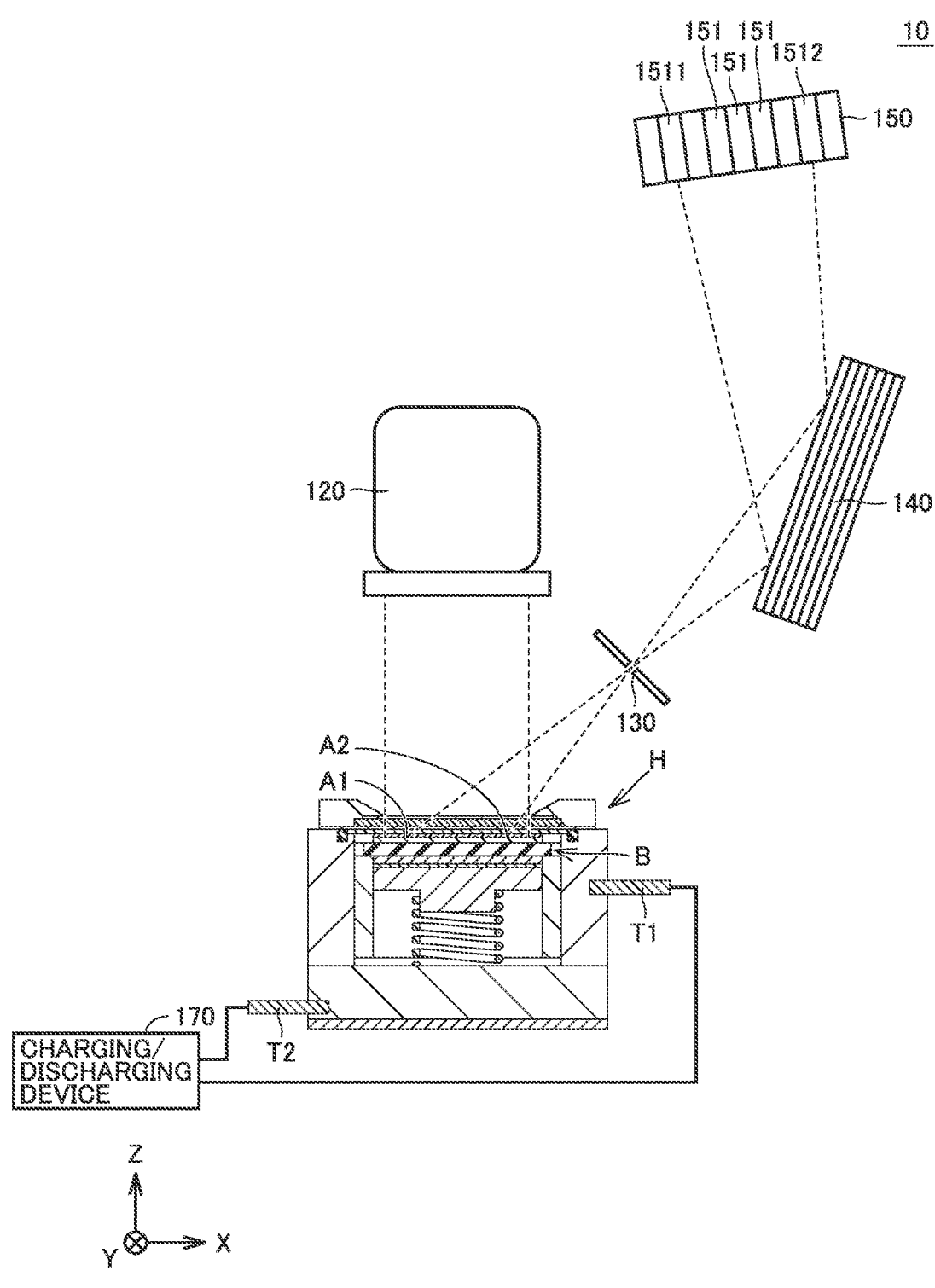
FIG. 2 is a view schematically illustrating an internal configuration of an apparatus body.
Figure 3:
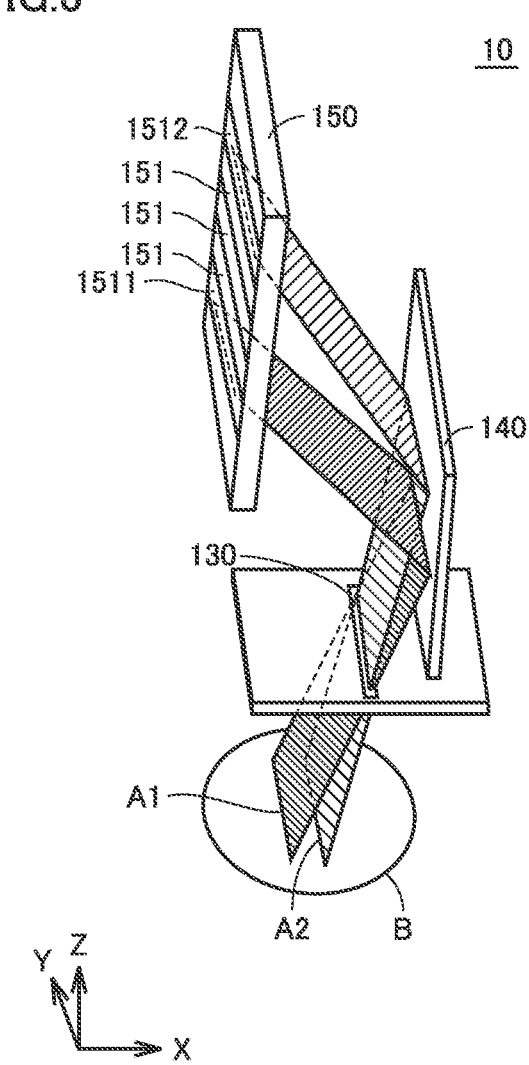
FIG. 3 is a view schematically illustrating an internal configuration of the apparatus body.

FIGS. 2 and 3 are views schematically illustrating an internal configuration of the apparatus body 10. With reference to FIGS. 2 and 3, the apparatus body 10 includes a holder H that holds the battery B, an excitation source 120, a slit 130, a spectroscopic crystal 140, and a detector 150. In FIG. 2, a surface of the holder H on which the battery B is held is defined as an X-Y plane, and an irradiation direction of an excitation beam from the excitation source 120 is defined as a Z-axis direction. In the present specification, the "upper direction" refers to the Z-axis positive direction, and the "lower direction" refers to the Z-axis negative direction. The spectroscopic crystal 140 and the detector 150 constitute a "spectrometer" in the present disclosure.

The excitation source 120 is an X-ray source that irradiates the battery B with an X-ray that is an excitation beam (excitation light). As the excitation source 120, an electron beam source may be used instead of the X-ray source. The excitation beam from the excitation source 120 is irradiated on the battery B. In the example of FIG. 2, the excitation beam is irradiated perpendicularly to the surface of the battery B, but the excitation beam may be irradiated at an angle inclined with respect to the surface of the battery B.

In the spectroscopic crystal 140, a specific crystal plane is parallel to the surface of the crystal. Only the specific crystal plane is used to detect the characteristic X-rays. This can prevent the characteristic X-rays which are Bragg-reflected by the other crystal plane from being erroneously detected.

As illustrated in FIG. 3, the detector 150 includes a plurality of detection elements 151. Each of the plurality of detection elements 151 extends in the Y-axis direction.

Hereinafter, the operation of the analysis apparatus 100 according to the present embodiment will be described. As illustrated in FIG. 2, when the excitation source 120 irradiates the battery B with an excitation beam, characteristic X-rays are emitted from the battery B. The emitted characteristic X-rays have different wavelengths depending on the materials constituting the battery B. In FIG. 2, an excitation beam from the excitation source 120 is irradiated on a region between a position A1 and a position A2. The characteristic X-rays emitted from the region pass through the slit 130 to reach the spectroscopic crystal 140. In FIG. 2, the characteristic X-rays generated at positions A1 and A2 are indicated by broken lines. The position A2 is located in the positive direction of the position A1 in the X-axis direction. The position A1 and the position A2 each extend in the Y-axis direction (see FIG. 3).

The characteristic X-rays emitted from the battery B pass through the slit 130 and are incident on the spectroscopic crystal 140. The incident angle of the characteristic X-rays to the spectroscopic crystal 140 varies depending on the position where the characteristic X-rays are generated in the battery B.

Among the characteristic X-rays incident on the spectroscopic crystal 140 from the battery B, only the characteristic X-rays having a wavelength satisfying the conditions of Bragg reflection are diffracted by the spectroscopic crystal 140 to reach the detector 150.

The characteristic X-rays diffracted by the spectroscopic crystal 140 are emitted at the same angle as the incident angle. Thus, the Bragg-reflected characteristic X-rays are detected by a detection element 151 among the plurality of detection elements 151 which is located at a position corresponding to the emission angle. Thus, the characteristic X-rays with wavelengths satisfying the Bragg condition at different diffraction angles are detected by each of the plurality of detection elements. In other words, the wavelength of the characteristic X-rays can be identified by identifying the detection element which detects the characteristic X-rays. On the other hand, the wavelength of the characteristic X-rays differs for each material. Therefore, the materials contained in the battery B to be analyzed can be identified by identifying the detection elements where the characteristic X-rays are detected in the detector 150.

As described above, the spectrometer of the apparatus body 10 spectrally disperses the characteristic X-rays generated by irradiating the battery B with the excitation beam to detect the intensity of each wavelength. The apparatus body 10 transmits the intensity of each detection element (the intensity of each detection element among the plurality of detection elements) to the signal processing device 20. Thereby, the signal processing device 20 can acquire a plurality of wavelengths and the intensity of the characteristic X-ray corresponding to each of the plurality of wavelengths.

Hereinafter, the calculation of a peak energy by the signal processing device 20 will be described. An energy E and a wavelength λ of the characteristic X-ray satisfy an equation E=hc/λ. Where h is the Planck's constant and c is the speed of light. According to this equation, the signal processing device 20 acquires the energy and the intensity of the characteristic X-ray corresponding to the energy. The signal processing device 20 measures the energy of a characteristic X-ray which has a peak intensity (hereinafter referred to as "peak energy").

As described above, in the analysis apparatus 100, the spectrometer of the apparatus body 10 spectrally disperses the characteristic X-rays generated by irradiating the battery B with the excitation beam to detect the intensity of each wavelength. The signal processing device 20 processes a signal output from the apparatus body 10. Therefore, the analysis apparatus 100 can analyze the state of the battery B via X-ray spectroscopic analysis.

Further, as illustrated in FIG. 2, the apparatus body 10 may include a charging/discharging device 170. The charging/discharging device 170 is controlled by the processor 30 of the signal processing device 20. When the charging/discharging device 170 is connected to each of a positive electrode terminal T1 and a negative electrode terminal T2 (which will be described later in detail) of the holder H, the charging/discharging device 170 controls the charging and discharging of the battery B. Note that the charging/discharging device 170 may be a device independent of the apparatus body 10 as long as it can control the charging and discharging of the battery B.

[3. Configuration of Holder and Battery]

Hereinafter, the configuration of the holder H that holds the battery B when the battery B is analyzed by the analysis apparatus 100 will be described.

Figure 4:
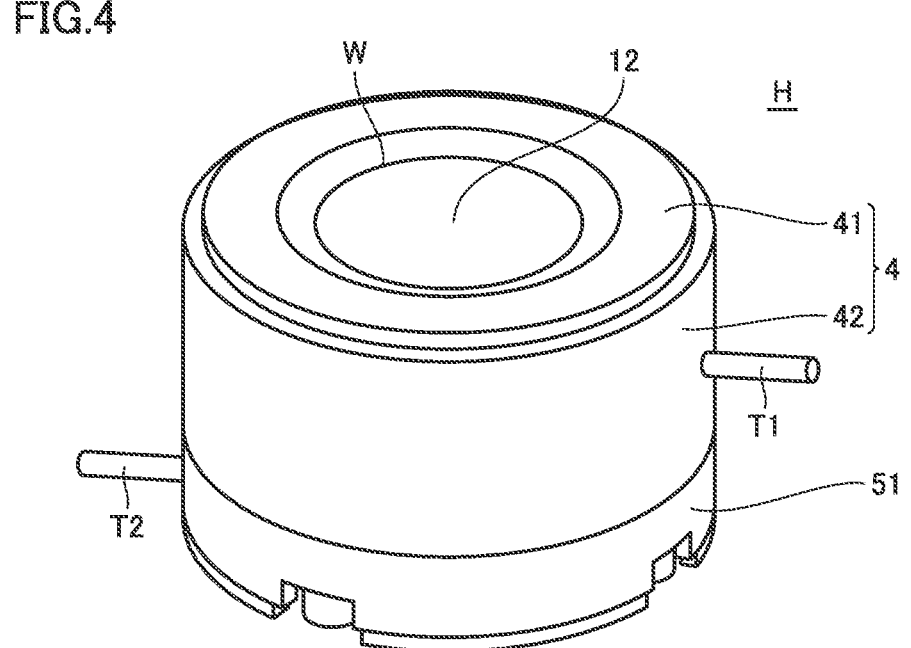
FIG. 4 is a perspective view of a holder.

FIG. 4 is a perspective view of the holder H. With reference to FIG. 4, the holder H includes a body 4, a plate member 12, a base plate 51, a positive electrode terminal T1, and a negative electrode terminal T2.

The body 4 is disposed on the base plate 51. The body 4 includes a cylindrical cell body 42 and a window frame 41 disposed on the cell body 42. A sample chamber in which the battery B is disposed is formed in the body 4. In the window frame 41, a window W is formed between the sample chamber and the excitation source 120. The plate member 12 is disposed in the window W. The body 4 and the base plate 51 are preferably made of metal. For example, the body 4 and the base plate 51 are made of stainless steel.

The positive electrode terminal T1 and the negative electrode terminal T2 are connected to the charging/discharging device 170, respectively. The battery B is charged or discharged by the charging/discharging device 170 via the positive electrode terminal T1 and the negative electrode terminal T2.

The positive electrode terminal T1 electrically connects the positive electrode of the battery B disposed in the holder H and the charging/discharging device 170. In the example of FIG. 4, the positive electrode terminal T1 is a rod-shaped metal terminal or a plate-shaped metal terminal connected to the cell body 42. The positive electrode terminal T1 may be formed as an integral part of the cell body 42, for example. In this case, the positive electrode terminal T1 and the cell body 42 are stably connected to each other. Alternatively, for example, the positive electrode terminal T1 may be formed to be detachable from the cell body 42. In this configuration, when it is not necessary to connect the battery B to the charging/discharging device 170, the positive electrode terminal T1 may be detached from the cell body 42. Thus, the side surface of the battery B becomes a simple cylindrical shape. Therefore, for example, when the battery B is rotated, the positive electrode terminal does not hinder the rotation. Note that the configuration of the positive electrode terminal T1 is not limited to the above example, and for example, the positive electrode terminal T1 includes a portion (for example, the body 4) between a terminal that is electrically connected to the charging/discharging device 170 and is detachable from the holder H and the positive electrode of the battery B.

The negative electrode terminal T2 electrically connects the negative electrode of the battery B disposed in the holder H and the charging/discharging device 170. In the example of FIG. 4, the negative electrode terminal T2 is a rod-shaped metal terminal or a plate-shaped metal terminal connected to the base plate 51. The negative electrode terminal T2 may be formed as an integral part of the base plate 51, for example. In this case, the negative terminal T2 and the base plate 51 are stably connected to each other. Alternatively, for example, the negative electrode terminal T2 may be formed to be detachable from the base plate 51. In this configuration, when it is not necessary to connect the battery B to the charging/discharging device 170, the negative electrode terminal T2 may be detached from the base plate 51. Thus, the side surface of the battery B becomes a simple cylindrical shape. Therefore, for example, when the battery B is rotated, the negative electrode terminal does not hinder the rotation. The configuration of the negative electrode terminal T2 is not limited to the above example, and for example, the negative electrode terminal T2 includes a portion (for example, the base plate 51) between a rod-shaped terminal which is electrically connected to the charging/discharging device 170 and is detachable from the holder H and the negative electrode of the battery B.

Figure 5:
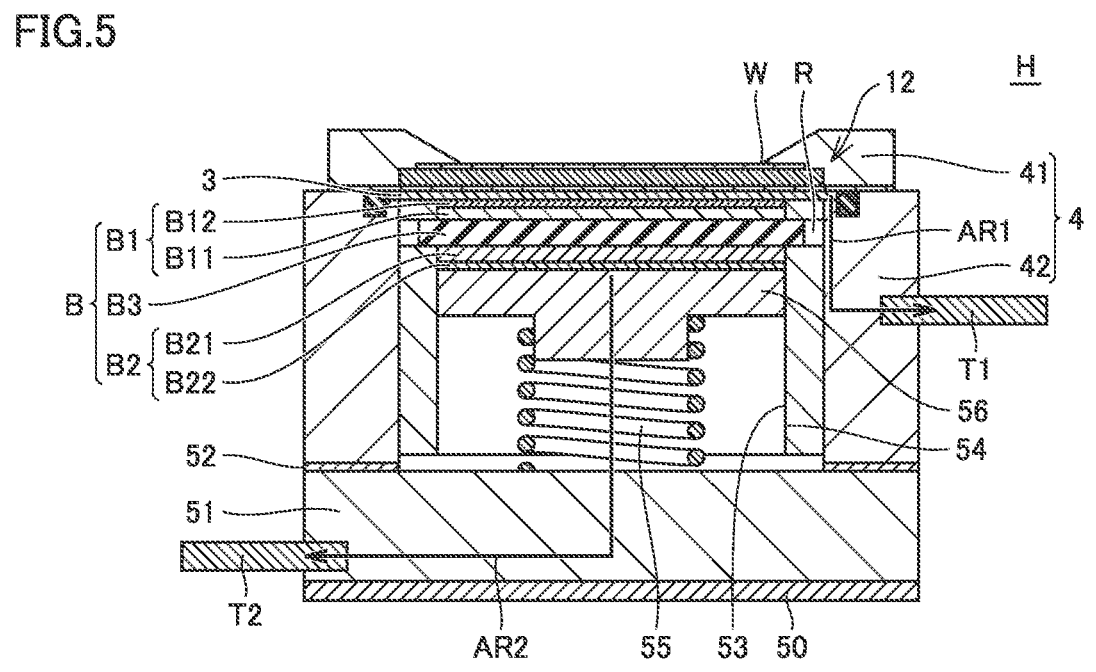

FIG. 5 is a cross-sectional view illustrating an example of the internal configuration of the holder H and the configuration of the battery B. The holder H further includes an insulating plate 50, an insulating spacer 52, an inner cylinder 53, an electrode guide 54, a spring 55, an electrode support member 56, and a conductive member 3.

A sample chamber R is formed inside the holder H. In the example of FIG. 5, the sample chamber R is a space surrounded by the conductive member 3, the electrode guide 54, and the electrode support member 56. The battery B is disposed in the sample chamber R.

The battery B includes a positive electrode B1, a negative electrode B2, and a separator B3. In the example of FIG. 5, the battery B is a lithium ion secondary battery. The positive electrode B1 includes a positive electrode material B11 and a positive electrode current collector B12. The positive electrode material B11 is, for example, a single or composite metal oxide of cobalt, nickel or manganese, or an iron phosphate-based material such as $LiFePO_4$. The positive electrode current collector B12 is made of, for example, aluminum. The negative electrode B2 includes a negative electrode material B21 and a negative electrode current collector B22. The negative electrode material B21 is, for example, a carbon-based material or an alloy-based material. The negative electrode current collector B22 is made of, for example, copper. The separator B3 is provided between the positive electrode B1 and the negative electrode B2. The separator B3 is, for example, a microporous film made of polyolefin. Since the configuration, the composition and the function of each part of the lithium ion secondary battery are publicly known, the detailed description thereof will not be repeated.

The insulating plate 50 is disposed under the base plate 51. The inner cylinder 53 is disposed on the base plate 51 and inside the cell body 42. The electrode guide 54, the electrode support member 56, and the battery B disposed in the sample chamber R are disposed inside the inner cylinder 53. The insulating spacer 52 is disposed between the base plate 51 and the cell body 42, and electrically insulates the base plate 51 and the cell body 42.

The insulating plate 50, the inner cylinder 53, and the insulating spacer 52 are made of an electrical insulating material. The insulating plate 50, the inner cylinder 53, and the insulating spacer 52 are made of, for example, polyphenylene sulfide (PPS).

The electrode guide 54 retains the spring 55. The spring 55 generates a pushing force when the electrode support member 56 is pressed from the above. The electrode support member 56 is disposed on the spring 55, and is configured to transmit the pushing force of the spring 55 to the battery B. As a result, the negative electrode B2 of the battery B is in close contact with the electrode support member 56. The positive electrode B1 of the battery B is in close contact with the conductive member 3.

The electrode support member 56 and the spring 55 are made of a conductive material. The electrode support member 56 and the spring 55 are made of, for example, stainless steel. The electrode guide 54 is made of, for example, PPS.

According to this configuration, as indicated by an arrow AR2, the negative electrode B2 of the battery B is electrically connected to the negative electrode terminal T2 via the electrode support member 56, the spring 55 and the base plate 51.

The conductive member 3 is disposed between the positive electrode B1 of the battery B and the plate member 12 so as to be in contact with the positive electrode B1 of the battery B. The conductive member 3 is made of a conductive material. According to this configuration, as indicated by an arrow AR1, the positive electrode B1 of the battery B is electrically connected to the positive electrode terminal T1 via the conductive member 3 and the cell body 42.

The window frame 41, the plate member 12 and the conductive member 3 serve as a lid for the sample chamber R. Hereinafter, the window frame 41, the plate member 12 and the conductive member 3 are collectively referred to as the "lid". The user opens the lid and places the battery B in the sample chamber R.

[4. Detailed Configuration Near Window of Battery Holder]

Figure 6:
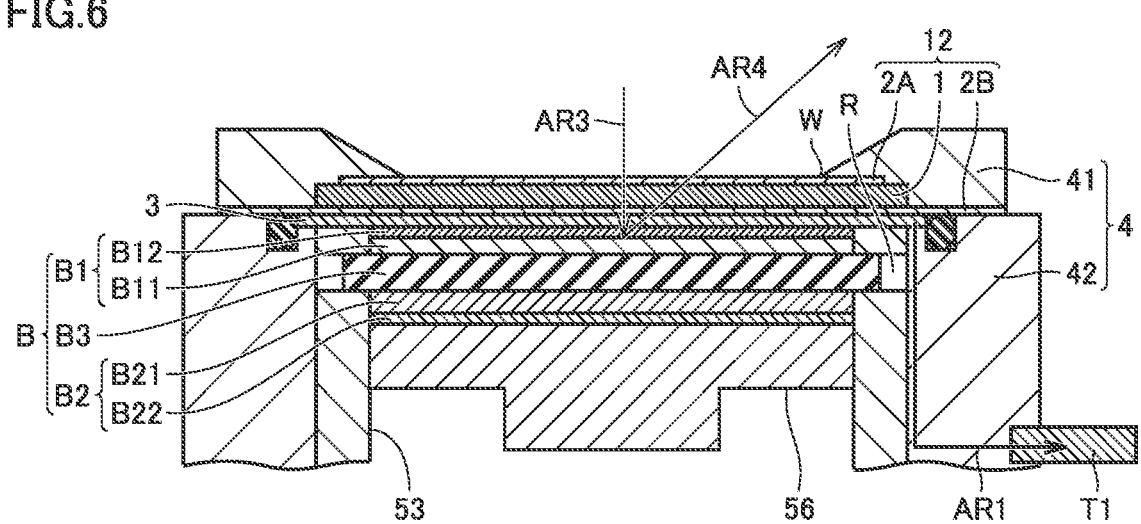
FIG. 6 is a cross-sectional view illustrating an example configuration near a window of the holder.

FIG. 6 is a cross-sectional view illustrating an example configuration near the window W of the holder H. In FIG. 6 and subsequent figures, the description of the configuration below the electrode support member 56 is omitted.

An arrow AR3 indicates an excitation beam radiated from the excitation source 120 to the battery B. An arrow AR4 indicates characteristic X-rays generated from the battery B and detected by the spectrometer. In the example of FIG. 6, the positive electrode material B11 of the positive electrode B1 of the battery B is irradiated with the excitation beam (arrow AR3), and the characteristic X-rays (arrow AR4) are generated from the positive electrode material B11.

The plate member 12 includes a resin member 2A, a resin member 2B, and a beryllium plate 1. The resin members 2A and 2B correspond to an embodiment of a "first resin member".

The resin members 2A and 2B are disposed on the surface of the beryllium plate 1. Beryllium is such a metal that has high X-ray permeability but may affect the human body. Therefore, by preventing the beryllium from being directly exposed to the atmosphere with the resin members 2A and 2B, the user can handle the holder H without excessive concern about the influence of beryllium on the human body. For example, the user will feel more comfortable when placing the battery B in the holder H for X-ray spectroscopic analysis. The resin members 2A and 2B are preferably made of a resin that has high X-ray permeability and low X-ray damage. The resin with high X-ray permeability is, for example, a low-density resin. The resin with low X-ray damage is a resin having a cyclic structure. When the resin members 2A and 2B are constructed in this manner, the X-ray permeability of the resin members 2A and 2B is high. In other words, as indicated by the arrows AR3 and AR4, the excitation beam irradiated from the excitation source 120 and the characteristic X-rays generated from the positive electrode B1 pass through the resin members 2A and 2B. As described above, since the beryllium plate 1 also has high X-ray permeability, the excitation beam irradiated from the excitation source 120 and the characteristic X-rays generated from the positive electrode B1 also pass through the plate member 12. In other words, X-ray spectroscopic analysis can be performed through the plate member 12.

Specifically, the resin members 2A and 2B include, for example, polyimide resin. The polyimide resin is a robust resin that has high X-ray permeability, excellent mechanical strength and excellent chemical resistance. Thus, by providing the polyimide resin on the surface, the possibility of exposing the beryllium plate to the outside is reduced. In other words, it is even easier to handle the plate member 12. As another example, the resin members 2A and 2B are made of PTFE (polytetrafluoroethylene), which is a fluororesin. Depending on the type of the resin, the intensity of the excitation beam to be irradiated, and the temperature or the like, the moisture contained in the resin members 2A and 2B may cause side reactions other than the battery reaction to occur, which may adversely affect the measurement accuracy. This problem can be suppressed by forming the resin members 2A and 2B with a highly water-repellent fluororesin. The resin members 2A and 2B may be made of materials different from each other. For example, the resin member 2A on the upper surface, which is hard to come into contact with the electrolytic solution, may be made of polyimide resin, and the resin member 2B on the lower surface may be made of fluorine resin. As a further example, the resin members 2A and 2B are made of PEEK (polyether ether ketone).

The total thickness of the resin members 2A and 2B in the direction perpendicular to the beryllium plate 1 (Z-axis direction) is preferably 100 μm or less. With this configuration, the X-ray permeability of the resin members 2A and 2B is sufficiently high. The effect of not exposing beryllium is sufficient even though the resin members 2A and 2B are thin, and therefore, for example, a film with a thickness of 12.5 μm, which is the thinnest film of commercially available films, may be used. In other words, the thicknesses of the resin members 2A and 2B may be determined in consideration of the X-ray permeability and the ease of handling by the manufacturer and the user.

The conductive member 3 preferably includes aluminum. Aluminum is such a metal that has high X-ray permeability. On the other hand, unlike beryllium, it is easier to handle aluminum because there is no concern about its influence on human body. In addition, aluminum has high conductivity, and therefore ensures the electrical conduction between the positive electrode B1 of the battery B and the positive electrode terminal T1. Thus, according to this configuration, not only X-ray spectroscopic analysis but also charging and discharging can be performed while the battery B is being held by the holder H. In addition, it is easy to handle the conductive member 3. Therefore, in the present specification, the conductive member 3 is made of aluminum unless otherwise specified.

The conductive member 3 is vapor-deposited on the resin member 2B, for example. As will be described later, the conductive member 3 may be a foil member, but when the conductive member 3 is vapor-deposited and integrated with the resin member 2B, it is easier for the user to handle the conductive member 3 than the case when the conductive member 3 is separate from the resin member 2B. For example, when the user places the battery B into the sample chamber R, there is no risk of accidentally dropping the conductive member 3.

The conductive member 3 may be directly vapor-deposited on the lower surface of the beryllium plate 1. In this case, only the resin member 2A is provided on the upper surface of the beryllium plate 1, and the resin member 2B may not be provided. Even with such a configuration, the lower surface of the beryllium plate 1 is not exposed, and because the resin member 2B is removed, the X-ray permeability in the window W is increased. On the other hand, considering the possibility that the conductive member 3 may be peeled off due to repeated use and thereby the beryllium plate 1 is exposed, it is safer to have the conductive member 3 vapor-deposited on the lower surface of the beryllium plate 1 on which the resin member 2B is vapor-deposited.

The conductive member 3 may be formed into a film and is disposed between the positive electrode B1 of the battery B and the resin member 2B. In this case, the user must be careful not to drop the conductive member 3 when placing the battery B in the sample chamber R. On the other hand, the cost and labor for vapor-depositing the conductive member 3 on the resin member 2B during manufacturing can be omitted. The manufacturer may appropriately choose whether to vapor-deposit the conductive member 3 on the resin member 2B or to form the conductive member 3 into a film and dispose it between the positive electrode B1 and the resin member 2B in consideration of the advantages and disadvantages of each method.

The conductive member 3 preferably has a thickness of 0.1 μm or more and 10 μm or less. With this configuration, the X-ray permeability of the conductive member 3 is sufficiently high. Therefore, the excitation beam radiated from the excitation source 120 and the characteristic X-rays generated from the positive electrode B1 also pass through the conductive member 3.

With this configuration, the excitation beam radiated from the excitation source 120 passes through the resin members 2A and 2B, the beryllium plate 1 and the conductive member 3, and is radiated on the positive electrode B1 of the battery B. The characteristic X-rays generated from the positive electrode B1 pass through the conductive member 3, the resin members 2A and 2B and the beryllium plate 1, and are detected by the spectrometer. Therefore, the X-ray spectroscopic analysis can be performed on the battery materials without disassembling the battery B.

[5. Comparison with Conventional Battery Holder]

The state of the structure and composition of the battery materials in a lithium ion battery may change due to charging and discharging or degradation. This state change can be analyzed by X-ray spectroscopic analysis. Therefore, X-ray spectroscopic analysis of the battery materials is useful in the development of lithium ion batteries.

On the other hand, the battery materials of the lithium ion battery are highly reactive with moisture and oxygen in air. Therefore, in order to prevent the intrusion of air, the lithium ion battery for development also has a metal laminated configuration. Specifically, for example, the battery materials are sealed in a stainless steel cell body with a stainless steel lid. However, since a metal laminate such as stainless steel absorbs X-rays significantly, it is not possible to perform the X-ray spectroscopic analysis on the battery materials with the metal laminate in place. Therefore, as described in PTL 1, conventionally it was common to disassemble a battery and take out only the positive electrode material, which is one of the battery materials, for analysis.

However, it is technically very difficult to completely restore a lithium ion battery to its original state before disassembly by using the battery materials of the lithium ion battery which has been disassembled and subjected to the X-ray spectroscopic analysis. Specifically, for example, the battery materials may be damaged during restoration. In addition, for example, the contact conditions of the battery materials may change, and the electrical characteristics such as contact resistance may change. Therefore, it is difficult to use this method to analyze the continuous structural changes of the battery materials during charging and discharging.

Therefore, users have been longing for a method of performing X-ray spectroscopic analysis on the battery materials without disassembling the battery.

Therefore, in the analysis apparatus 100 according to the present embodiment, the plate member 12 including the beryllium plate 1 with the resin members 2A and 2B provided on the surface thereof is disposed in the window W of the holder H. Thus, the X-ray spectroscopic analysis can be performed nondestructively on the battery materials by irradiating the battery materials with X-rays through the plate member 12.

In addition, in the present embodiment, the X-ray spectroscopic analysis can be performed on the battery materials while the battery B is being held in the holder H. In other words, it is easy to perform the X-ray spectroscopic analysis and the charging and discharging of the battery B repeatedly in sequence. Therefore, it is possible to analyze discrete changes in the battery materials during charging and discharging. In addition, as illustrated in FIG. 3, in the case where the apparatus body 10 includes a charging/discharging device 170, it is possible to perform the X-ray spectroscopic analysis in real time while the battery B is being charged or discharged. In this case, the continuous changes in the battery materials during charging and discharging can be analyzed. Therefore, the holder H according to the present embodiment can be used to analyze the continuous changes of the installed battery B.

[6. Process Flow in Analysis Apparatus]

With the holder H in which the battery B is installed as described above, the analysis apparatus 100 can be used to perform the X-ray spectroscopic analysis on the battery B based on the following process.

Figure 7:
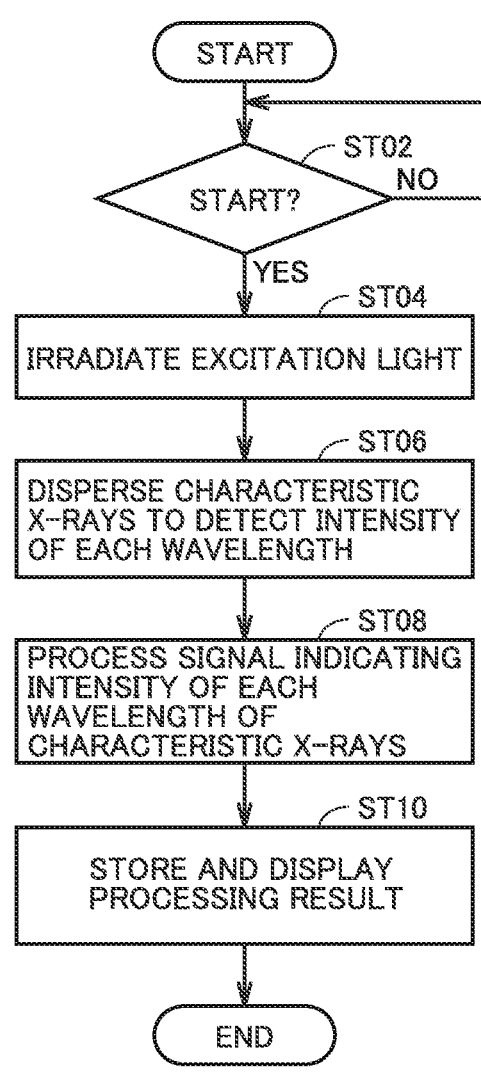
FIG. 7 is a flowchart illustrating a process related to X-ray spectroscopic analysis.

FIG. 7 is a flowchart illustrating a process related to the X-ray spectroscopic analysis. The process of FIG. 7 is performed by the analysis apparatus 100.

Before the process of FIG. 7 is performed, firstly, the user opens the lid of the holder H and installs the battery B. Then, the user charges or discharges the battery B by using, for example, the charging/discharging device 170.

When the charging/discharging device 170 is included in the apparatus body 10, the user first installs the holder H in the apparatus body 10 and connects the charging/discharging device 170 to charge or discharge the battery B. On the other hand, when the charging/discharging device 170 is provided outside the apparatus body 10, the user first connects the holder H to the charging/discharging device 170 to charge or discharge the battery B, and then installs the holder H in the apparatus body 10.

With reference to FIG. 7, in step ST02, the processor 30 of the signal processing device 20 determines whether or not the user has input an instruction to start an analysis through the operation unit 26. When an instruction to start an analysis is not input (NO in step ST02), the processor 30 repeats step ST02.

When an instruction to start an analysis is input (YES in step ST02), in step ST04, the excitation source 120 of the apparatus body 10 irradiates an excitation beam to the holder H which is formed inside with a sample chamber R in which the battery B is disposed according to a command of the processor 30.

In step ST06, the spectrometer disperses the characteristic X-rays generated from the battery B to detect the intensity of each wavelength. The signal indicating the detected intensity of each wavelength of the characteristic X-rays is transmitted to the signal processing device 20.

In step ST08, the processor 30 of the signal processing device 20 processes the signal indicating the intensity of each wavelength of the characteristic X-rays. In step ST10, the processor 30 stores the processing result in the memory 32. In addition, the processor 30 displays the processing result on the display 24, and ends the process.

According to the above process, the analysis apparatus 100 can perform the X-ray spectroscopic analysis without disassembling the battery B installed in the holder H. In addition, the analysis apparatus 100 can notify the user of the result of the X-ray spectroscopic analysis.

[7. Modifications]

In the following modifications, the configuration of a holder for improving the intensity of characteristic X-rays detected by the spectrometer will be described.

(First Modification)

Figure 8:
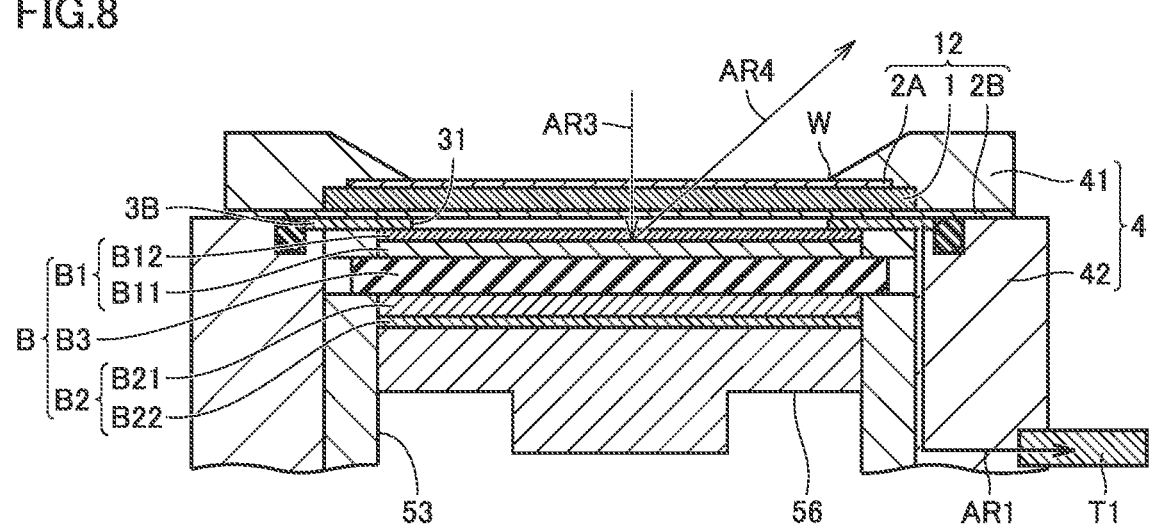
FIG. 8 is a cross-sectional view illustrating a first modification of the embodiment.

FIG. 8 is a cross-sectional view illustrating a first modification of the embodiment. With reference to FIG. 8, an opening 31 is formed in the conductive member 3B at a position overlapping the window W. The shape of the opening 31 is, for example, circular or rectangular, but is not limited thereto.

The conductive member 3 illustrated in FIG. 6 has high X-ray permeability, but does not transmit all the X-rays. Therefore, if the conductive member 3B is configured as illustrated in FIG. 8, the excitation beam from the excitation source 120 passes through the opening 31 of the conductive member 3B and is irradiated on the sample, i.e., the battery B. In other words, the excitation beam irradiated on the battery B is not attenuated by the conductive member 3B. Therefore, the intensity of the excitation beam is stronger than that in the case when the opening 31 is not formed in the conductive member 3.

The characteristic X-rays generated from the battery B also pass through the opening 31 of the conductive member 3B to reach the spectrometer. In other words, the characteristic X-rays reaching the spectrometer are not attenuated by the conductive member 3B. Therefore, the intensity of the characteristic X-rays is stronger than that in the case when the opening 31 is not formed in the conductive member 3.

In other words, since the opening 31 is formed in the conductive member 3B, even when an excitation beam of the same intensity is irradiated from the excitation source 120, the characteristic X-rays can be detected with a stronger intensity than that in the case where the opening 31 is not formed in the conductive member 3. Therefore, it is possible to obtain an analysis result with a higher S/N ratio.

When the holder H is configured as described above, since it is not necessary to consider the attenuation of the excitation beam and the characteristic X-rays caused by the conductive member 3B, the thickness of the conductive member 3B may be set larger than that in the case where the opening 31 is not formed. For example, the thickness of the conductive member 3B may be 10 μm or more. When the conductive member 3B is configured to have a larger thickness, the conductive member 3B also has a larger rigidity. In other words, it is easy for the user and the manufacturer to handle the conductive member 3B. In addition, at the time of assembling the holder H, a defect such as an edge of the conductive member 3B being improperly turned up is less likely to occur in the conductive member 3B.

In addition, since it is not necessary to consider the attenuation of the excitation beam and the characteristic X-rays caused by the conductive member 3B, the conductive member 3B can be made of a material with lower X-ray permeability and higher conductivity than aluminum, such as copper. This widens the choice of available materials for the conductive member 3B.

(Second Modification)

Figure 9:
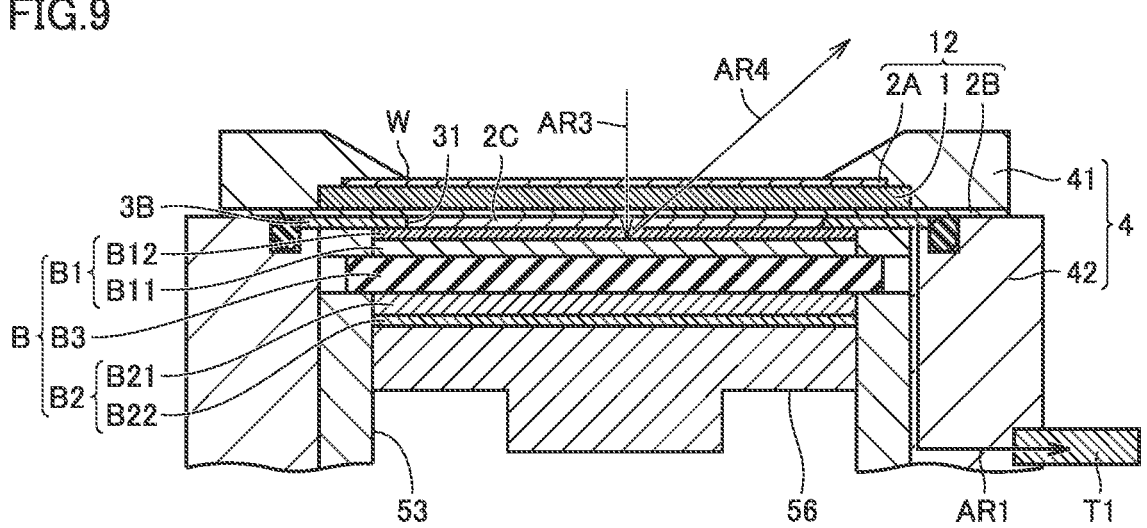
FIG. 9 is a cross-sectional view illustrating a second modification of the embodiment.

FIG. 9 is a cross-sectional view illustrating a second modification of the embodiment. With reference to FIG. 9, a resin member 2C is disposed inside the opening 31 of the conductive member 3B. The resin member 2C corresponds to one embodiment of a "second resin member". The resin member 2C preferably has the same thickness as the opening 31.

As an example, the resin member 2C is formed into a film, and is disposed between the positive electrode B1 and the resin member 2B. In this case, the resin member 2C has, for example, a size that is larger than the X-ray irradiation range but smaller than the opening 31. As another example, the resin member 2C is formed by filling the opening 31 with a resin paste. In this case, the resin member 2C has, for example, the same size as the opening 31.

According to this configuration, it is possible to prevent deformation such as distortion caused by a pushing force applied by the spring 55 from the lower side (the Z-axis negative side) to the battery B from occurring in a portion of the battery B corresponding to the opening 31 by the physical interference of an inclusion (the resin member 2C).

The resin member 2C is preferably made of a resin with high X-ray permeability and low X-ray damage. The resin member 2C is made of, for example, polyimide resin. With this configuration, the excitation beam from the excitation source 120 passes through the plate member 12 and the resin member 2C, and is irradiated on the sample, i.e., the battery B. The characteristic X-rays generated from the battery B also pass through the resin member 2C and the plate member 12 to reach the spectrometer. In other words, the X-ray spectroscopic analysis can be performed on the battery materials without disassembling the battery B.

[Aspects]

It will be understood by those skilled in the art that the exemplary embodiments described above are specific examples of the following aspects.

(First Aspect) A holder according to one aspect of the present disclosure is a holder that holds a battery which is subjected to X-rays analysis. The battery includes a positive electrode and a negative electrode. A sample chamber for disposing the battery therein is formed inside the holder. The holder includes a body, a beryllium plate, a first resin member, a conductive member, a positive electrode terminal, and a negative electrode terminal. An upper surface of the body is formed with a window. The beryllium plate is arranged in the window. The first resin member is provided on a surface of the beryllium plate. The conductive member is provided between the positive electrode and the first resin member so as to be in contact with the positive electrode of the battery. The positive electrode terminal is electrically connected to the conductive member. The negative electrode terminal is electrically connected to the negative electrode.

According to the holder described in the first aspect, the X-ray spectroscopic analysis can be performed on the battery by irradiating the battery materials with X-rays through the beryllium plate disposed in the window of the holder. Therefore, it is possible to analyze the battery materials without disassembling the battery.

(Second Aspect) In the holder according to the first aspect, the first resin member may include polyimide resin.

The polyimide resin has high X-ray permeability. In other words, according to the holder described in the second aspect, it is easy to perform the X-ray spectroscopic analysis on the battery through the plate member which includes the first resin member and the beryllium plate. The polyimide resin is a robust resin that has high X-ray permeability, excellent mechanical strength and excellent chemical resistance. Therefore, by providing a resin member made of polyimide resin on the surface, the possibility of exposing the beryllium plate to the outside can be reduced. In other words, according to the holder described in the second aspect, it is also easier to handle the plate member.

(Third Aspect) In the holder according to the first or second aspect, the first resin member may include fluororesin.

Depending on the type of the resin, the intensity of the excitation beam to be irradiated, and the temperature or the like, the moisture contained in the first resin member may cause side reactions other than the battery reaction, which may adversely affect the measurement accuracy. Therefore, according to the holder described in the third aspect, this problem can be suppressed by using a highly water-repellent fluororesin as the first resin member.

(Fourth Aspect) In the holder according to any one of the first aspect to the third aspect, a total thickness of the first resin member in a direction perpendicular to the beryllium plate may be 100 μm or less.

According to the holder of the fourth aspect, the X-ray permeability of the first resin member is sufficiently high.

(Fifth Aspect) In the holder according to any one of the first aspect to the fourth aspect, the conductive member may include aluminum.

Aluminum is a metal having high X-ray permeability next to beryllium. On the other hand, unlike beryllium, it is easier to handle aluminum because there is no concern about its influence on human body. According to the holder of the fifth aspect, the X-ray spectroscopic analysis can be performed on the battery while it is being held by the holder. In addition, it is easy to handle the conductive member.

(Sixth Aspect) In the holder according to any one of the first aspect to the fifth aspect, the conductive member may have a thickness of 0.1 μm or more and 10 μm or less.

According to the holder of the sixth aspect, the X-ray permeability of the conductive member is sufficiently high.

(Seventh Aspect) In the holder according to any one of the first aspect to the sixth aspect, the conductive member may be vapor-deposited on the first resin member.

According to the holder of the seventh aspect, it is easier for the user to handle the conductive member than the case when the conductive member is separate from the first resin member.

(Eighth Aspect) In the holder according to any one of the first aspect to the seventh aspect, the conductive member may be formed into a film and disposed between the positive electrode and the first resin member.

According to the holder of the eighth aspect, it is possible to omit the cost and labor for vapor-depositing the conductive member on the first resin member during manufacturing.

(Ninth Aspect) In the holder according to any one of the first aspect to the eighth aspect, an opening may be formed in the conductive member at a position overlapping the window.

According to the holder of the ninth aspect, when the excitation beam with the same intensity is irradiated from the irradiation source, the characteristic X-rays can be detected with a stronger intensity in the opening than that in the case where an opening is not formed in the conductive member. Therefore, it is possible to obtain an analysis result with a higher S/N ratio.

(Tenth Aspect) In the holder according to the ninth aspect, the holder may further include a second resin member, and the second resin member may be disposed inside the opening.

According to the holder of the tenth aspect, it is possible to prevent deformation such as distortion caused by a pushing force applied by the spring from the lower side to the battery from occurring in a portion of the battery corresponding to the opening by the physical interference of an inclusion, i.e., the second resin member.

(Eleventh Aspect) An analysis apparatus according to one aspect includes a holder, a spectrometer, and a signal processing device. The holder holds the battery. The spectrometer disperses characteristic X-rays generated by irradiating the battery which is held by the holder with an excitation beam, and detects the intensity of each wavelength. The signal processing device processes a signal output from the spectrometer. The battery includes a positive electrode and a negative electrode. The holder includes a body, a beryllium plate, a resin member, a conductive member, a positive electrode terminal, and a negative electrode terminal. The body is formed with a sample chamber for disposing the battery therein and a window in the incident direction of the excitation beam. The beryllium plate is arranged in the window. The resin member is provided on a surface of the beryllium plate. The conductive member is provided between the positive electrode and the resin member so as to be in contact with the positive electrode. The positive electrode terminal is electrically connected to the conductive member. The negative electrode terminal is electrically connected to the negative electrode.

According to the analyzer of the eleventh aspect, the X-ray spectroscopic analysis can be performed on the battery by irradiating the battery materials with X-rays through the beryllium plate disposed in the window of the holder. Therefore, it is possible to analyze the battery materials without disassembling the battery.

(Twelfth Aspect) An analysis method according to one aspect of the present disclosure is an analysis method of a battery, and the method includes the steps of: irradiating the battery held in a holder with an excitation beam; dispersing characteristic X-rays generated from the battery and detecting the intensity of each wavelength; and processing a signal indicating the intensity of each wavelength of the characteristic X-rays. The battery includes a positive electrode and a negative electrode. The holder includes a body, a beryllium plate, a resin member, a conductive member, a positive electrode terminal, and a negative electrode terminal. The body is formed with a sample chamber for disposing the battery therein and a window in the incident direction of the excitation beam. The beryllium plate is arranged in the window. The resin member is provided on a surface of the beryllium plate. The conductive member is provided between the positive electrode and the resin member so as to be in contact with the positive electrode. The positive electrode terminal is electrically connected to the conductive member. The negative electrode terminal is electrically connected to the negative electrode.

According to the analysis method of the twelfth aspect, the X-ray spectroscopic analysis can be performed on the battery by irradiating the battery materials with X-rays through the beryllium plate disposed in the window of the holder. Therefore, it is possible to analyze the battery materials without disassembling the battery.

It should be understood that the embodiments and the examples disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: beryllium plate; 12: plate member; 2A, 2B, 2C: resin member; 3, 3B: conductive member; 4: body; 10: apparatus body; 20: signal processing device; 22: controller; 24: display; 26: operation unit; 30: processor; 31: opening; 32: memory; 34: communication I/F; 36: input/output I/F; 41: window frame; 42: cell body; 50: insulating plate; 51: base plate; 52: insulating spacer; 53: inner cylinder; 54: electrode guide; 55: spring; t; 100: analysis apparatus; 120: excitation source; 130: slit; 140: spectroscopic crystal; 150: detector; 151: detection element; 170: charging/discharging device; B: battery; B1: positive electrode; B2: negative electrode; B3: separator; B11: positive electrode material; B12: positive electrode current collector; B21: negative electrode material; B22: negative electrode current collector; H: holder; R: sample chamber; T1: positive electrode terminal; T2: negative electrode terminal; W: window.

The invention claimed is:

1. A holder that holds a battery which is subjected to X-ray analysis, the battery including a positive electrode and a negative electrode, the holder comprising:
   a body with a sample chamber for disposing the battery therein, and the body including an upper surface with a window;
   a beryllium plate disposed in the window;
   a first resin member provided on a surface of the beryllium plate;
   a conductive member provided between the positive electrode and the first resin member so as to be in contact with the positive electrode of the battery;
   a positive electrode terminal electrically connected to the conductive member; and
   a negative electrode terminal electrically connected to the negative electrode.

2. The holder according to claim 1, wherein the first resin member includes polyimide resin.

3. The holder according to claim 1, wherein the first resin member includes fluororesin.

4. The holder according to claim 1, wherein a total thickness of the first resin member in a direction perpendicular to the beryllium plate is 100 μm or less.

5. The holder according to claim 1, wherein the conductive member includes aluminum.

6. The holder according to claim 1, wherein the conductive member has a thickness of 0.1 μm or more and 10 μm or less.

7. The holder according to claim 1, wherein the conductive member is vapor-deposited on the first resin member.

8. The holder according to claim 1, wherein the conductive member is formed into a film, and is disposed between the positive electrode and the first resin member.

9. The holder according to claim 1, wherein an opening is formed in the conductive member at a position overlapping the window.

10. The holder according to claim 9, wherein the holder further includes a second resin member, and the second resin member is disposed inside the opening.

11. An analysis apparatus for analyzing a battery, the analysis apparatus comprising:

a holder that holds the battery;

a spectrometer that disperses characteristic X-rays generated by irradiating the battery which is held by the holder with an excitation beam, and detects the intensity of each wavelength; and a signal processing device that processes a signal output from the spectrometer, wherein the battery includes a positive electrode and a negative electrode, the holder includes:

a body with a sample chamber for disposing the battery therein and with a window in an incident direction of the excitation beam;

a beryllium plate disposed in the window;

a resin member provided on a surface of the beryllium plate;

a conductive member provided between the positive electrode and the resin member so as to be in contact with the positive electrode of the battery;

a positive electrode terminal electrically connected to the conductive member; and a negative electrode terminal electrically connected to the negative electrode.

12. An analysis method for analyzing a battery, the analysis method comprising:

irradiating the battery held in a holder with an excitation beam;

dispersing characteristic X-rays generated from the battery and detecting the intensity of each wavelength; and processing a signal indicating the intensity of each wavelength of the characteristic X-rays, wherein the battery includes a positive electrode and a negative electrode, the holder includes:

a body with a sample chamber for disposing the battery therein and with a window in an incident direction of the excitation beam;

a beryllium plate disposed in the window;

a resin member provided on a surface of the beryllium plate;

a conductive member provided between the positive electrode and the resin member so as to be in contact with the positive electrode of the battery;

a positive electrode terminal electrically connected to the conductive member; and a negative electrode terminal electrically connected to the negative electrode.

\* \* \* \* \*